(12) United States Patent
Mulder et al.

(10) Patent No.: US 9,647,896 B1
(45) Date of Patent: May 9, 2017

(54) RULE-BASED ACTIONS FOR RESOURCES IN A DISTRIBUTED EXECUTION ENVIRONMENT

(71) Applicant: Amazon Technologies, Inc., Seattle, WA (US)

(72) Inventors: Brian Frederick Mulder, Cape Town (ZA); Ross Bevan Engers, Cape Town (ZA); Joshua Mentz, Cape Town (ZA); Ronen Dov Agranat, Cape Town (ZA); Willem Jacob Buys, Cape Town (ZA); Timothy Ralph Sjoberg, Cape Town (ZA); James Alfred Gordon Greenfield, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 579 days.

(21) Appl. No.: 14/135,013

(22) Filed: Dec. 19, 2013

(51) Int. Cl.
*G06F 15/173* (2006.01)
*H04L 12/24* (2006.01)

(52) U.S. Cl.
CPC .................................. *H04L 41/22* (2013.01)

(58) Field of Classification Search
CPC .............................. H04L 63/10; H04L 63/08
USPC ........ 709/220, 223, 224, 226; 715/701, 736, 715/762
See application file for complete search history.

(56) References Cited

U.S. PATENT DOCUMENTS

| | | | |
|---|---|---|---|
| 6,629,136 B1 | 9/2003 | Naidoo | |
| 7,032,186 B1 | 4/2006 | Gasser et al. | |
| 7,822,707 B1 | 10/2010 | Yehuda et al. | |
| 7,925,491 B2 | 4/2011 | Sasatani et al. | |
| 8,032,621 B1 | 10/2011 | Upalekar et al. | |
| 8,955,148 B1 * | 2/2015 | Biegala | H04L 63/10 726/27 |
| 2003/0112958 A1 | 6/2003 | Beaudoin et al. | |
| 2007/0005382 A1 | 1/2007 | Sayers | |
| 2008/0201455 A1 | 8/2008 | Husain | |
| 2009/0006987 A1 * | 1/2009 | Simhi | G06F 8/24 715/762 |

(Continued)

OTHER PUBLICATIONS

"User-Driven Access Control: Rethinking Permission Granting in Modern Operating Systems" —Rosenser et al, IEEE, UDAC, Sep. 2012 http://www.franziroesner.com/pdf/udac-oakland2012.pdf.*

(Continued)

*Primary Examiner* — Randy Scott
(74) *Attorney, Agent, or Firm* — Lee & Hayes, PLLC

(57) ABSTRACT

A distributed execution environment provides resources such as computing resources, hardware resources, and software resources. Resource action rules ("rules") may be defined and associated with resources in the distributed execution environment. The rules may be evaluated based upon resource state data defining the state of one or more resources. The results of the evaluation of the rules may be utilized to take various actions. For example, the results of the evaluation of rules may be utilized to generate a user interface (UI) object for providing information regarding the evaluation of the rule, to initiate a workflow, and/or perform another type of action. The results might also be utilized to prohibit certain types of operations from being performed with regard to a resource. The results might be propagated to other resources. A UI might also be provided for use in defining the rules.

20 Claims, 9 Drawing Sheets

(56) References Cited

U.S. PATENT DOCUMENTS

| | | | |
|---|---|---|---|
| 2009/0070697 A1 | 3/2009 | LaForest | |
| 2009/0161557 A1 | 6/2009 | Macias | |
| 2009/0171730 A1* | 7/2009 | Bobak | G06Q 10/00 |
| | | | 705/80 |
| 2009/0271725 A1 | 10/2009 | Dirla | |
| 2010/0223557 A1* | 9/2010 | Kenney | G06Q 10/10 |
| | | | 715/736 |
| 2011/0072506 A1 | 3/2011 | Law et al. | |
| 2011/0157357 A1 | 6/2011 | Weisensale et al. | |
| 2011/0241833 A1 | 10/2011 | Martin et al. | |
| 2014/0052844 A1 | 2/2014 | Nayak et al. | |
| 2014/0061294 A1 | 3/2014 | Kempf et al. | |

OTHER PUBLICATIONS

Office action for U.S. Appl. No. 13/733,604 mailed on Nov. 6, 2015, Mentz et al., "Managing Resources in a Distributed Execution Environment", 29 pages.

Final Office Action for U.S. Appl. No. 13/733,604, mailed on Jan. 29, 2015, Joshua Mentz, "Managing Resources in a Distributed Execution Environment", 29 pages.

Office action for U.S. Appl. No. 13/733,604, mailed on Oct. 1, 2014, Mentz et al., "Managing Resources in a Distributed Execution Environment", 26 pages.

U.S. Appl. No. 13/733,604, filed Jan. 3, 2013, Mentz et al.

"New iPhone app translates foreign-language signs" [online][retrieved on Nov. 26, 2012], retrieved from: http://articles.cnn.com/2010-12-20/tech/word.lens.iphone.app_1_iphone-app-android-foreign-language?_s=PM:TECH 2 pps.

Schneider, B. "The Rete Matching Algorithm", Dec. 5, 2002 published online by Dr. Dobb's Journal, © 2013 [online][retrieved on Dec. 19, 2013] retrieved from: http://www.drdobbs.com/architecture-and-design/the-rete-matching-algorithm/184405218 7 pps.

"Drools" [online][retrieved on Dec. 19, 2013] retrieved from: http://www.jboss.org/drools/ 13 pps.

Non Final Office Action for U.S. Appl. No. 13/733,604, mailed on Nov. 15, 2016 Joshua Mentz, "Managing Resources in a Distributed Execution Environment", 29 pages.

Office action for U.S. Appl. No. 13/733,604, mailed on Jul. 1, 2016, Mentz et al., "Managing Resources in a Distributed Execution Environment", 28 pages.

\* cited by examiner

RULE-BASED ACTIONS FOR RESOURCES IN A DISTRIBUTED EXECUTION ENVIRONMENT

BACKGROUND

Network-based services exist that allow customers to purchase and utilize virtual machine instances on a permanent or as-needed basis. In addition to virtual machine instances, these services typically allow customers to purchase and utilize other types of computing resources. For example, customers might be permitted to purchase and utilize data storage resources, database resources, networking resources, and other types of computing resources (which may be referred to herein as "resources").

Managing network-based services such as those described above can be extremely complex. At least some of this complexity is attributable to the large number of computing resources that typically exist in such a service at any given time. For example, some network-based services might utilize dozens of geographically dispersed data centers, hundreds of thousands or even millions of server computers and virtual machine instances, along with large numbers of networking components, software programs, and other types of resources. When large numbers of resources such as these are utilized by a network service in this way, it can be very difficult to obtain information regarding the operational status of a particular resource. Moreover, it may be difficult to determine when the current operational status of one resource may affect the operation of other resources.

The disclosure made herein is presented with respect to these and other considerations.

DETAILED DESCRIPTION

Figure 1:
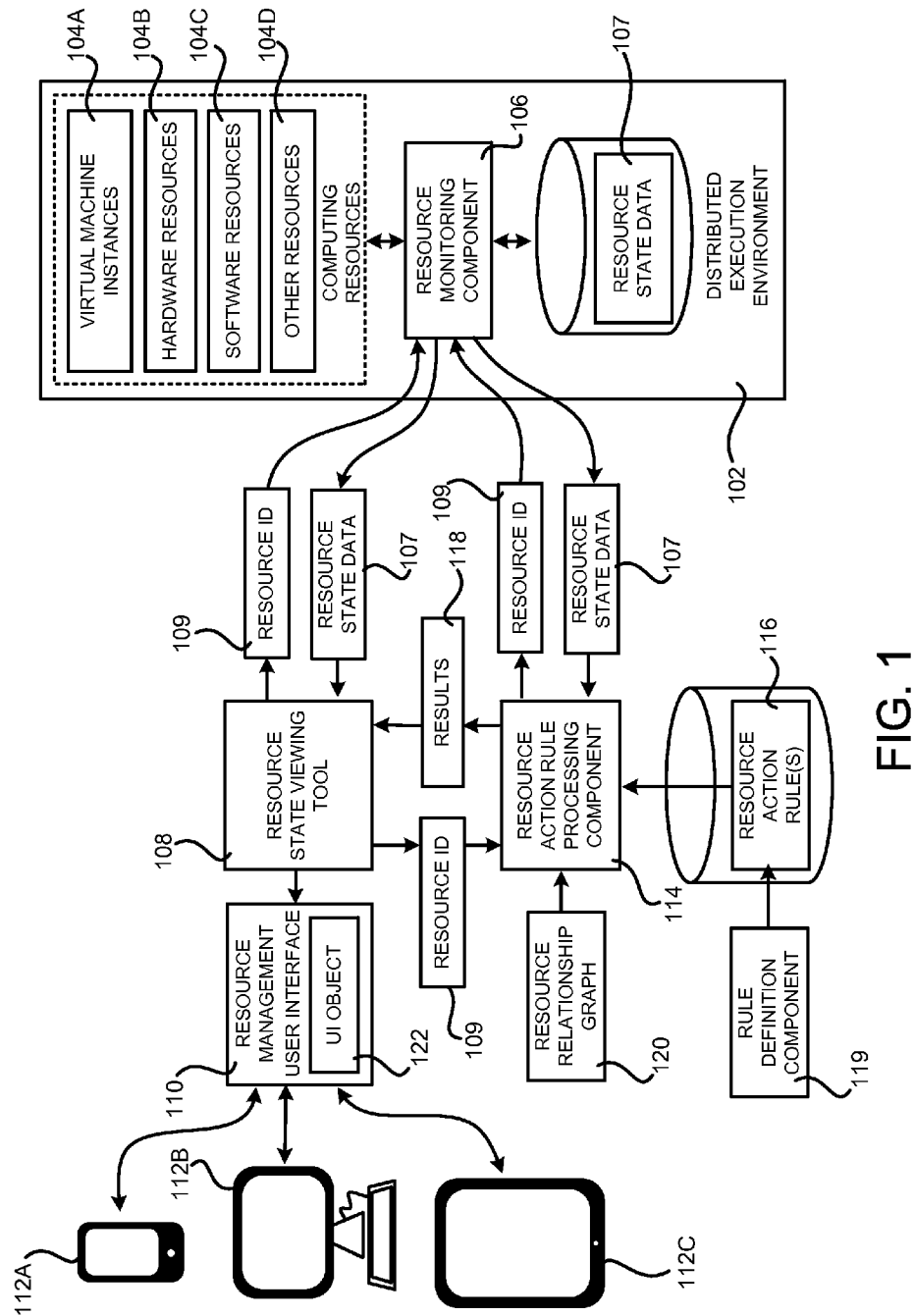
FIG. 1 is a computer system diagram providing an overview description of one mechanism disclosed herein for performing actions based upon the evaluation of rules associated with resources in a distributed execution environment, according to one embodiment presented herein.

The following detailed description is directed to technologies for performing actions based upon the evaluation of rules associated with resources in a distributed execution environment. Utilizing the concepts and technologies described herein, various types of actions can be performed based upon the evaluation of resource action rules (which may be referred to herein as "resource rules" or "rules") that are associated with resources in a distributed execution environment. For example, a UI might be provided that includes a UI object configured to present information regarding the current operational status of a resource. The results of the evaluation of the resource action rules for a resource might also be propagated to other related resources. In this way, information regarding the operational status of a resource might also be presented with regard to other related resources. Other types of actions might also be performed based upon the results of the evaluation of rules associated with resources in a distributed execution environment.

According to one aspect presented herein, a computer-implemented mechanism is disclosed for performing actions based upon the evaluation of rules associated with resources in a distributed execution environment. In one implementation, the mechanism disclosed herein operates in conjunction with a network-based distributed execution environment in which customers can purchase, configure, and utilize computing resources, such as virtual machine instances, data storage resources, networking resources, and database resources, on a permanent or as-needed basis.

The distributed execution environment may offer computing resources for purchase and use in various configurations. For example, the distributed execution environment might offer virtual machine instances available for purchase and use that have many different configurations of processor capabilities, main memory, disk storage, and operating system. A customer of the distributed execution environment might create, configure, and deploy various combinations of computing resources provided by a distributed execution environment to create "solutions" that provide various types of functionality, such as application hosting, backup and storage, content delivery, Web hosting, enterprise IT solutions, database services, and others.

The distributed execution environment might also include various types of computing resources such as those described above, hardware resources such as data centers, rooms of server computers in data centers, racks of server computers, individual server computers, software resources, resources describing customers and other users of the distributed execution environment, and other types of resources. As will be described in greater detail below, the technologies disclosed herein can be utilized to assist with the management of the operation of these, and potentially other, types of resources.

A resource monitoring component executing within or in conjunction with the distributed execution environment might be configured to collect data regarding the state of computing resources in the distributed execution environment. For example, the resource monitoring component might collect resource state data that describes the operational state of data centers, racks of server computers, server computers, networking devices, software components, and/or instances of virtual machines and other types of resources in the distributed execution environment. The resource monitoring component might also make the collected resource state data available for consumption and use by other components.

In one implementation, a resource state viewing tool executes within or in conjunction with the distributed execution environment, and provides a resource management UI through which users can view the resource state data collected by the resource monitoring component. For example, an administrator or customer of the distributed execution environment might utilize a user computing system, like a desktop or laptop computer, a smartphone, or a tablet computing device to request and view the resource management UI for a particular resource. In order to provide this functionality, the resource management UI might be provided by way of a Web page, a client-server application, a mobile application, or in another manner. The resource management UI may allow a user to quickly view information about resources in the distributed execution environment at various levels of granularity.

In one implementation, resource action rules might also be defined and utilized to perform various actions with regard to resources in the distributed execution environment. In order to provide this functionality, a UI or another type of interface may be provided through which resource action rules can be defined. Resource action rules are rules that define one or more actions to be taken if certain conditions occur with respect to the operational state of a resource, or resources, in a distributed execution environment. For example, and without limitation, resource action rules may define one or more actions that are to be taken when the resource state data for a resource collected by the resource monitoring component described above meets certain predefined conditions. Various types of logical, arithmetic, and other types of operators might be utilized to define the resource action rules.

Certain types of events may trigger the evaluation of resource action rules for a resource in the distributed execution environment. For example, and without limitation, a request may be received to view the resource management UI described above for a particular resource in the distributed execution environment. In response to receiving such a request, one or more resource action rules may be identified that are associated with the resource. For example, if the resource is a virtual machine instance, a determination may be made as to whether any resource action rules have been created and stored that apply to virtual machine instances and/or to the particular virtual machine instance. In this regard, it should be appreciated that resource action rules may be defined on a per-resource basis, based upon resource type, or on another basis.

If one or more resource action rules have been defined that apply to the resource, resource state data for the resource may be obtained. As discussed above, the resource state data defines aspects of the operational state of a resource in the distributed execution environment. The resource state data may be obtained, for example, from the resource monitoring component described above. The resource state data might be obtained from other sources in other implementations.

Once the resource state data has been obtained for the resource, the resource action rule, or rules, associated with the resource is evaluated using the obtained resource state data. One or more actions may then be taken with regard to the resource based upon the results of the evaluation of the resource action rule, or rules. For example, and without limitation, a UI object (which may be referred to herein as a "badge") may be generated for presentation in the resource management UI for the resource that contains content based, at least in part, upon the results of the evaluation of the resource action rule, or rules, associated with the resource. As a specific example, a rule might specify that a UI object should be presented in the resource management UI for the resource indicating that a server computer should not be touched (e.g. shut down or restarted) if the server computer is currently executing one or more virtual machine instances that are owned by external customers of the distributed execution environment. In this example, a UI object might be presented in the resource management UI indicating that the resource should not be touched if the specified conditions are satisfied. If the conditions specified by the rule are not satisfied, a UI object might also be displayed indicating that the server computer is "safe to touch." The UI object might also include UI controls which, when selected, will cause various types of actions to be performed with regard to the resource. The UI controls that are shown with the UI object might be defined by the associated resource action rule, or rules.

It should be appreciated that other types of stimuli might also cause the resource action rules for a resource to be evaluated, and other types of actions might also be taken based upon the results of the evaluation of the resource action rules. For example, and without limitation, operations may be prohibited (e.g. shutting down or rebooting a server computer) based upon the results of the evaluation of resource action rules associated with a resource. Operations might also be performed (e.g. initiating a workflow) based upon the results of the evaluation of resource action rules associated with a resource. An indication of the results of the evaluation of resource action rules might also be provided by way of a hardware device associated with a resource. For example, and without limitation, a light might be illuminated on a hardware device based upon the results of the evaluation of the resource action rules.

The results of the evaluation of resource action rules for a resource might also be propagated to other related resources. For example, and without limitation, the results of resource action rules for a virtual machine instance might be propagated up to the server computer upon which the virtual machine instance is executing. Similarly, the results of the evaluation of resource action rules for a server computer may be propagated up to a server rack containing the server computer. By propagating the results of the evaluation of resource action rules, the results can be utilized with other related resources.

For example, and without limitation, a resource action rule may indicate that a server computer is executing external customer virtual machine instances and should therefore not be touched (e.g. rebooted or shut down). In this case, a UI object may be presented in the resource management UI for the server computer indicating that the server computer should not be touched. By propagating the results of the evaluation of this resource action rule to a server rack that contains the server computer, a similar indication might also be provided by way of a UI object in the resource management UI for the server rack indicating that the server rack contains server computers executing virtual machine instances owned by external customers and that the rack should therefore not be modified (e.g. powered down). Other types of indications and actions might be performed utilizing results of the evaluation of resource action rules that have been propagated from one resource in a distributed execution environment to another resource. Additional details regarding the various components and processes described above for performing actions based upon the evaluation of rules associated with resources in a distributed execution environment will be presented below with regard to FIGS. 1-9.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may be practiced in distributed execution environments, where tasks are performed by remote processing devices that are linked through a communications network. In a distributed execution environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a computer system diagram providing an overview description of a mechanism disclosed herein for performing actions based upon the evaluation of rules associated with resources in a distributed execution environment 102, according to one embodiment presented herein. In one embodiment, the mechanism disclosed herein operates in conjunction with a network-based distributed execution environment 102 in which customers can purchase and utilize various types of computing resources, such as virtual machine instances 104A, on a permanent or as-needed basis. The distributed execution environment 102 may offer virtual machine instances 104A for purchase in various configurations. For example, the distributed execution environment 102 might offer virtual machine instances 104A available for purchase and use that have many different configurations of processor capabilities, main memory, disk storage, and operating system.

In addition to the virtual machine instances 104A, the distributed execution environment 102 might also utilize and/or provide many other types of computing resources. For example, and without limitation, the distributed execution environment 102 might also include hardware resources 104B such as data centers that include rooms with racks of server computers, software resources 104C, and other resources 104D, such as networking resources, power resources, resources describing customers and other users of the distributed execution environment 102, and other types of resources. The distributed execution environment 102 might also include other types of computing resources not shown in FIG. 1 or identified explicitly above. As will be described in greater detail below, the technologies disclosed herein can be utilized to perform various types of actions with respect to these, and potentially other, types of computing resources in the distributed execution environment 102.

The operator of the distributed execution environment 102 may charge a fee for operating the virtual machine instances 104A to the customer that creates the virtual machine instances 104A. Various different pricing models might be utilized to charge a customer for use of the virtual machine instances 104A within the distributed execution environment 102. The operator of the distributed execution environment 102 might also charge a fee for the creation and/or use of other types of computing resources within the distributed execution environment 102.

In some implementations, a resource monitoring component 106 executes within or in conjunction with the distributed execution environment 102 and collects data, referred to herein as resource state data 107, regarding the state of the resources 104 in the distributed execution environment 102. For example, the resource monitoring component 106 might collect resource state data 107 that describes the operational state of hardware resources 104B in the distributed execution environment 102, such as data centers in the distributed execution environment 102, rooms of server computers in each data center, racks of server computers in each room, individual server computers in each rack of server computer, cooling components, power components, and networking components, in the distributed execution environment 102. The resource monitoring component 106 might similarly collect resource state data 107 that describes the operational state of software resources 104C and virtual machine instances 104A. The resource monitoring component 106 might also collect resource state data 107 regarding the configuration, status, and operation of other types of resources in the distributed execution environment 102.

In some implementations, the resource monitoring component 106 also makes the collected resource state data 107 available for consumption and use by other components. For example, in some embodiments, the resource monitoring component 106 is configured to expose an application programming interface ("API") or another mechanism through which other systems or components can request and receive the resource state data 107 collected for a particular computing resource. It should be appreciated that while the resource state data 107 is discussed herein primarily in the context of data describing the operational state of a computing resource, the resource state data 107 might include other information about a computing resource, such as information describing the configuration of the computing resource and other aspects of a computing resource. In this way, the resource monitoring component 106 can be utilized to obtain virtually any type of information about a resource in the distributed execution environment 102.

In some embodiments, a resource state viewing tool 108 executes within or in conjunction with the distributed execution environment 102 and provides a UI through which users can view the data collected by the resource monitoring component 106. For example, in one implementation the resource state viewing tool 108 is configured to provide a resource management UI 110. The resource management UI 110 provides a UI for viewing and interacting with data collected regarding the computing resources in the distributed execution environment 102. In one implementation, a user of a user computing device 112, such as a smartphone 112A, a desktop or laptop computer 112B, or a tablet computing device 112C, might utilize an appropriate client application (not shown in FIG. 1) to request, view, and interact with the resource management UI 110. In order to provide this functionality, the resource management UI 110 might be provided by way of a Web page, a client-server application, a mobile application, or in another manner.

The resource management UI 110 may be configured in order to allow a user to quickly view information about computing resources in the distributed execution environment 102 at various levels of granularity. For example, in one particular implementation, the resource management UI 110 allows a user to view information about resources in the distributed execution environment 102, such as information about the operational state of the resources, at levels of granularity varying from a worldwide level down to a level showing a particular virtual machine instance or other software component executing on a particular server computer. The user can utilize functionality provided by the resource management UI 110 to quickly and easily navigate between levels and view aggregated information about resources in the distributed execution environment 102 at each level. One particular resource management UI 110 is described in U.S. patent application Ser. No. 13/733,604, entitled "Managing Resources in a Distributed Execution Environment", which was filed on Jan. 3, 2013, and which is expressly incorporated by reference herein in its entirety. The embodiments disclosed herein might also be utilized with other types of user interfaces.

In order to generate the resource management UI 110 for a particular resource, the resource state viewing tool 108 may request the resource state data 107 for the resource from the resource monitoring component 106. In particular, in one embodiment the resource state viewing tool 108 transmits a request for the resource state data 107 for a resource to the resource monitoring component 106 that includes a resource identifier ("ID") 109. The resource ID 109 uniquely identifies the resource for which resource state data 107 is requested. The request may be provided to an API, for example, exposed by the resource monitoring component 106. The resource monitoring component 106 utilizes the provided resource ID 109 to locate the resource state data 107 for the resource and returns the resource state data 107 in response to the request. The resource state viewing tool 108 may then utilize the resource state data 107 to create the resource management UI 110 for the resource.

It should be appreciated that the resource management UI 110 might be configured for use by users employed by the owner or operator of the distributed execution environment 102, such as technical administrative employees. In this case, the resource management UI 110 might be configured to allow the users to view operational information about all of the computing resources in the distributed execution environment 102. These users might also be limited to viewing data for certain resources 104 based upon a security or clearance level or some other mechanism. In other embodiments, however, the users might be customers of the distributed execution environment 102 or employees of the customers. In this case, the resource management UI 110 might limit the users to viewing data only for resources in the distributed execution environment 102 that have been purchased by or that are in use by the customer. In this way, customers may be restricted to using the resource management UI 110 to obtain management information for their own resources 104. The resource management UI 110 might also restrict the provision of data to users of the distributed execution environment 102 in other ways.

As described briefly above, resource action rules 116 might also be defined in some embodiments and utilized to perform various actions with regard to resources in the distributed execution environment 102. In order to enable this functionality, a rule definition component 119 is provided in one embodiment. The rule definition component 119 provides a UI for defining and storing the resource action rules 116. As discussed briefly above, the resource action rules 116 are rules that define one or more actions to be taken if certain conditions occur with respect to the operational state of a resource, or resources, in the distributed execution environment 102. For example, and without limitation, resource action rules 116 may define one or more actions that are to be taken when the resource state data 107 for a resource collected by the resource monitoring component 106 described above meets certain pre-defined conditions. As mentioned above, various types of logical, arithmetic, and other types of operators might be utilized to define the resource action rules 116. The rules 116 might also specify which resources or types of resources they apply to and/or other types of information. Although the rule definition component 119 is shown in FIG. 1 as a standalone component, the functionality provided by the rule definition component 119 might be provided by another component in other implementations. Various aspects regarding the operation of the rule definition component 119 in one implementation will be provided below with regard to FIGS. 2 and 3.

In some implementations, a resource action rule processing component 114 (the "rule processing component 114") is configured to evaluate the resource action rules 116 and to cause actions defined by the rules 116 to be performed based upon the results of the evaluation. Certain types of events may trigger the rule processing component 114 to evaluate the resource action rules 116 for a resource in the distributed execution environment 102. For example, and without limitation, the resource state viewing tool 108 may receive a request to view the resource management UI 110 for a particular resource in the distributed execution environment 102, such as a virtual machine instance 104A. In response thereto, the resource state viewing tool 108 may retrieve the resource state data 107 in the manner described above. The resource state viewing tool 108 might also initiate the evaluation of any resource action rules 116 associated with the resource. For example, the resource state viewing tool 108 may transmit a request to the rule processing component 114 that includes the resource ID 109 for a particular resource.

In response to receiving a request from the resource state viewing tool 108, the rule processing component 114 is configured to identify the resource action rules 116, if any, that are associated with the identified resource. For example, if the identified resource is a virtual machine instance 104A, the rule processing component 114 may determine whether any resource action rules 116 have been previously created and stored that apply to virtual machine instances 104A and/or to the particular virtual machine instance identified by the specified resource ID 109. As mentioned above, the resource action rules 116 may be defined on a per-resource basis, based upon resource type, or on another basis. Various algorithms, such as the "Rete" algorithm may be utilized to select and execute the resource action rules 116 and to manage the propagation of events and state changes to other rules and resources in the manner described below. Other types of algorithms might also be utilized.

If the rule processing component 114 determines that one or more resource action rules 116 have been previously defined that apply to the identified resource, the rule processing component 114 may obtain the resource state data 107 for the identified resource from the resource monitoring component 106. For example, and without limitation, the rule processing component 114 may transmit a request to the resource monitoring component 106 that includes the resource ID 109 for the resource for which the resource state data 107 is requested. The resource monitoring component 106 will respond to the request with the resource state data 107 for the identified resource. As discussed above, the resource state data 107 defines aspects of the operational state of the resource in the distributed execution environment 102. The resource state data 107 might be obtained from other sources in other implementations.

Once the rule processing component 114 has obtained the resource state data 107 for the identified resource, the rule processing component 114 evaluates the resource action rule 116, or rules 116, associated with the identified resource using the resource state data 107 for the resource. The rule processing component 114 may then cause one or more actions to be taken with regard to the identified resource based upon the results of the evaluation of the resource action rule 116, or rules 116. For example, and without limitation, the rule processing component 114 may return the results 118 of the evaluation of the resource action rules 116 to the resource state viewing tool 108 for use in creating the resource management UI 110 for the identified resource. For example, and without limitation, the resource state viewing tool 108 may use the results 118 to generate a UI object 122 (which may be referred to herein as a "badge") for presentation in the resource management UI 110 for the resource.

The UI object 122 may be a graphical or textual UI object that contains content based, at least in part, upon the results 118 of the evaluation of the resource action rule 116, or rules 116, associated with the identified resource. As a specific example, a rule 116 might specify that a UI object 122 should be presented in the resource management UI 110 for the resource indicating that a server computer should not be touched (e.g. shut down or restarted) if the server computer is currently executing one or more virtual machine instances 104A that are owned by external customers of the distributed execution environment 102. In this example, a UI object 122 might be generated for presentation in the resource management UI 110 indicating that the resource should not be touched. The UI object 122 might also include UI controls which, when selected, will cause various types of actions to be performed with regard to the identified resource. Details regarding one illustrative UI object 122 generated and presented in one particular implementation will be provided below with regard to FIGS. 5 and 6.

It should be appreciated that other types of stimuli might also cause the rule processing component 114 to evaluate the resource action rules 116 for a resource. In some implementations, the rule processing component 114 is configured to periodically evaluate the resource action rules 116 and to store the results 118 for use in responding to requests, such as from the resource state viewing tool 108. Additionally, other types of actions might also be taken based upon the results 118 of the evaluation of the resource action rules 116. For example, and without limitation, operations may be prohibited (e.g. shutting down or rebooting a server computer) based upon the results of the evaluation of resource action rules 116 associated with a resource. Operations might also be performed, such as initiating a workflow, based upon the results of the evaluation of resource action rules 116 associated with a resource. An indication of the results 118 of the evaluation of resource action rules 116 might also be provided by way of a hardware device associated with a resource. For example, and without limitation, a light might be illuminated on a hardware device based upon the results 118 of the evaluation of the resource action rules 116 for a resource.

The rule processing component 114 might also propagate the results 118 of the evaluation of resource action rules 116 for a resource to other related resources. For example, and without limitation, the results 118 of the evaluation of resource action rules for a virtual machine instance 104A might be propagated up to the server computer upon which the virtual machine instance 104A is executing. Similarly, the results 118 of the evaluation of resource action rules 116 for a server computer may be propagated up to a server rack containing the server computer. By propagating the results of the evaluation of resource action rules 116, the results 118 can be utilized with other related resources.

For example, and without limitation, a resource action rule 116 may indicate that a server computer is executing external customer virtual machine instances 104A and should therefore not be touched (e.g. rebooted or shut down). In this case, a UI object 122 may be presented in the resource management UI 110 for the server computer indicating that the server computer should not be touched. By propagating the results 118 of the evaluation of this resource action rule 116 to a server rack that contains the server computer, a similar indication might also be provided by way of a UI object 122 in the resource management UI 110 for the server rack indicating that the server rack contains server computers executing virtual machine instances 104A owned by external customers and that the rack should therefore not be modified (e.g. powered down). Other types of indications and actions might be performed utilizing the results 118 of the evaluation of resource action rules 116 that have been propagated from one resource in the distributed execution environment 102 to another resource.

In some embodiments, the rule processing component 114 utilizes a resource relationship graph 120 to propagate the results 118 of the evaluation of resource action rules 116 from one resource to one or more other resources. The resource relationship graph 120 defines relationships between related resources in the distributed execution environment 102. For example, and without limitation, the resource relationship graph 120 might indicate that a virtual machine instance 104A is executing on a particular server computer, that the server computer is in a particular rack of server computers, that the rack of server computers is in a particular room, that the room is in a particular data center, and that the data center is in a particular region. This information may then be used to propagate results 118 from one resource to another resource. For example, results 118 of the evaluation of resource action rules 116 for a virtual machine instance 104A might be propagated to the server computer upon which the virtual machine instance 104A is executing. Similarly, results 118 of the evaluation of resource action rules 116 for a server computer in the distributed execution environment 102 might be propagated to the rack containing the server computer. Other mechanisms might also be utilized to determine which, if any, other resources the results 118 of the evaluation of the resource action rules 116 should be propagated. For example, and without limitation, the resource action rules 116 might define how propagation of the results 118 is to occur. Additional details regarding the various components and processes described above for performing actions based upon the evaluation of rules associated with resources in a distributed execution environment will be presented below with regard to FIGS. 1-9.

In the embodiment shown in FIG. 1, the resource state viewing tool 108 is configured to consume the results 118 of the evaluation of the resource action rules 116. It should be appreciated, however, that other devices, systems, services, and components might also consume the results 118 of the evaluation of the resource action rules 116 in order to perform various types of actions or to prevent certain types of actions from being taken with respect to a resource. For example, and without limitation, a capacity management system operating in conjunction with the distributed execution environment 102 might take a server computer out of service based upon results 118 of the evaluation of resource action rules 116.

Figure 3:
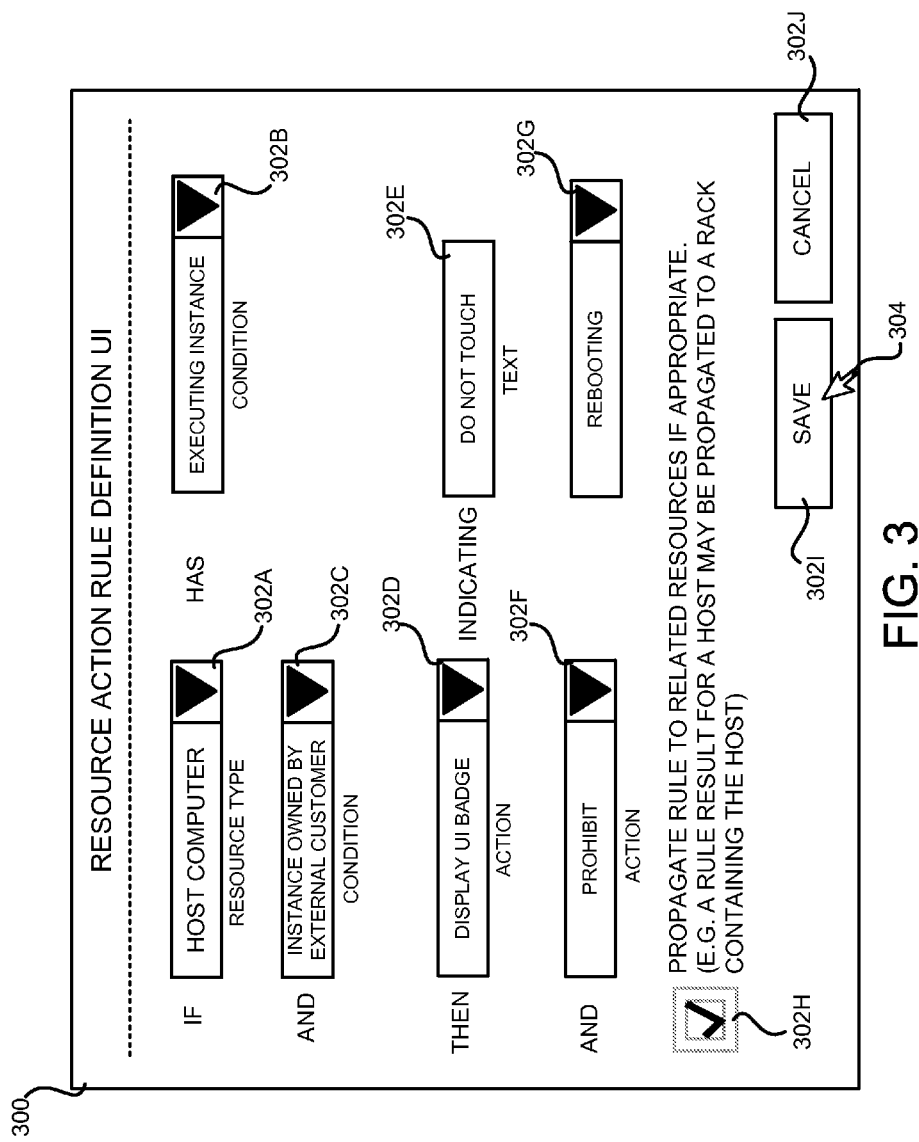
FIG. 3 is a user interface ("UI") diagram showing one illustrative UI disclosed herein for defining a resource action rule, according to one embodiment disclosed herein.
Figure 5:
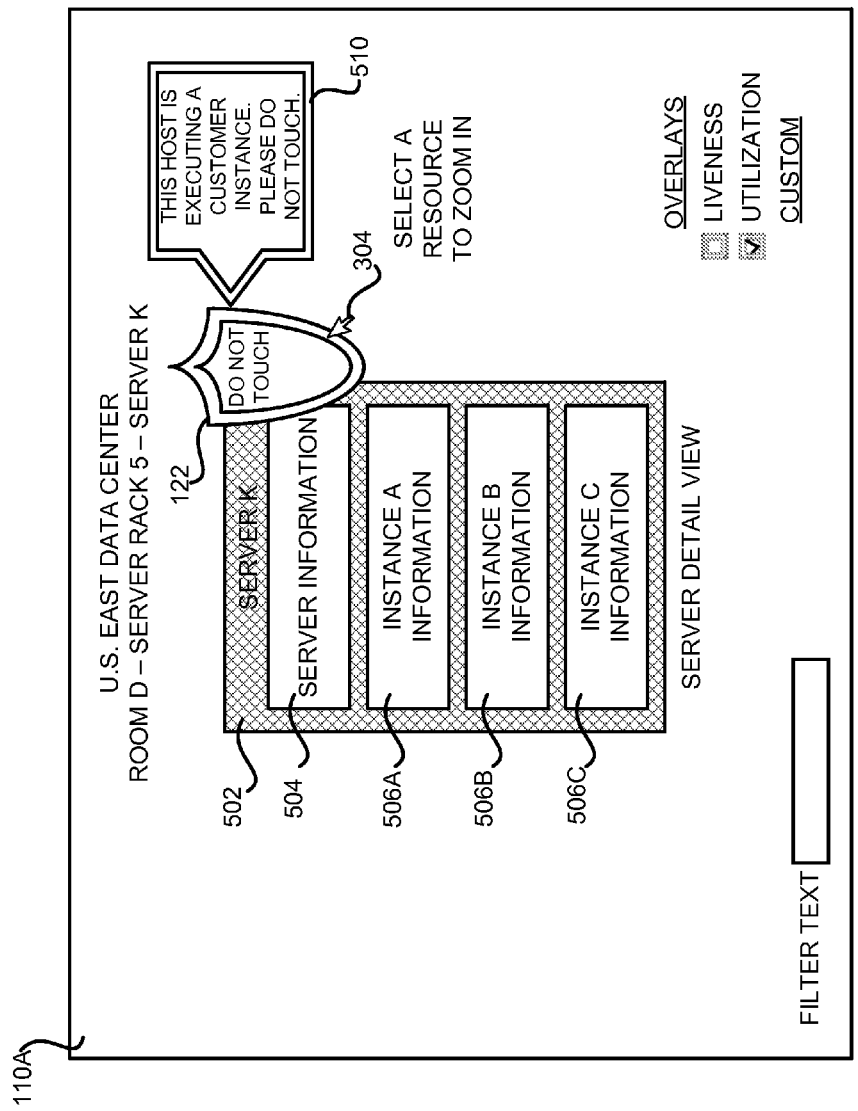
FIGS. 5 and 6 are UI diagrams showing several illustrative UIs disclosed herein for providing a UI object containing content that is based upon the evaluation of a resource action rule, according to one embodiment disclosed herein.
Figure 6:
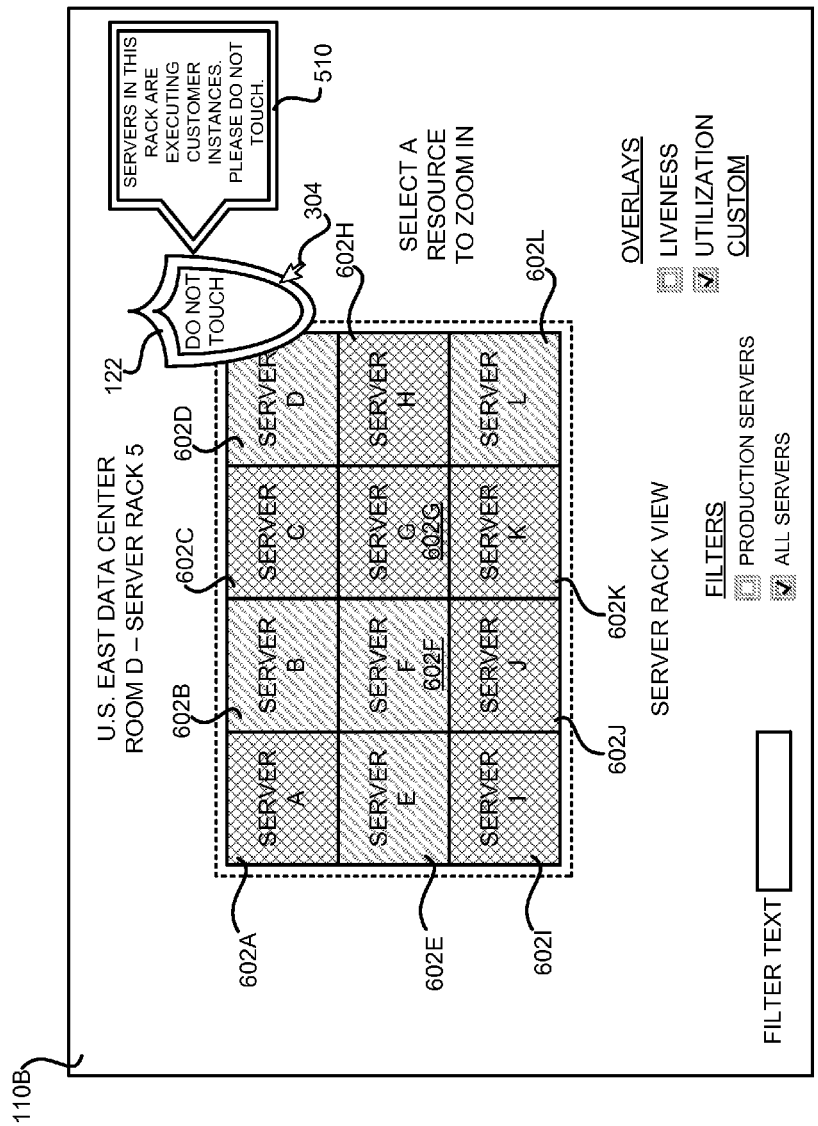

It should be appreciated that the implementation shown in FIG. 1 is merely illustrative and that other components operating within or outside the distributed execution environment 102 might be utilized to provide the functionality disclosed herein. For example, many more computers, networking devices, networks, software components, and other devices than those shown in FIG. 1 might be utilized in order to provide the functionality described herein. Moreover, these devices might be arranged, configured, and interconnected in other ways than shown in FIG. 1 to achieve the technical result disclosed herein. The embodiments presented herein should not be limited to the particular arrangement shown in FIG. 1 or the other FIGS. In this regard, it should be appreciated that the UI components shown in FIGS. 3, 5 and 6 are merely illustrative and that other types of UI controls and components arranged in other ways might also be utilized. Details regarding the configuration and operation of the distributed execution environment 102 will be provided below with regard to FIGS. 7-9.

Figure 2:
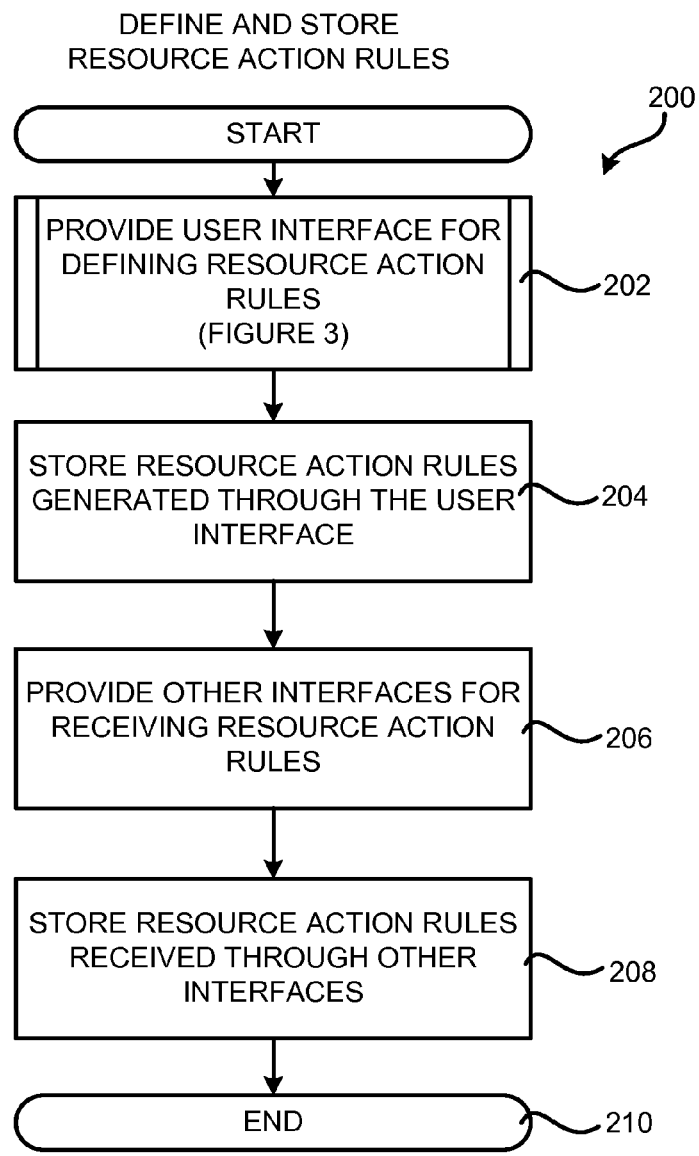
FIG. 2 is a flow diagram showing one illustrative routine for defining and storing resource action rules associated with resources in a distributed execution environment, according to one embodiment disclosed herein.

FIG. 2 is a flow diagram showing one illustrative routine 200 for defining and storing resource action rules 116 associated with resources in a distributed execution environment 102, according to one embodiment disclosed herein. It should be appreciated that the logical operations described herein with respect to FIG. 2 and the other figures are implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein.

The routine 200 begins at operation 202, where a component, such as the rule definition component 119 or another component, provides a UI for defining the resource action rules 116. One illustrative UI for defining the resource action rules 116 will be described below with regard to FIG. 3. Other types of UIs might also be provided in other embodiments.

Once a resource action rule 116 has been defined through a UI such as that shown in FIG. 3 and described below, the routine 200 may proceed from operation 202 to operation 204. At operation 204, the defined resource action rule 116 is stored in an appropriate data store, such as a database. Other types of data stores might also be utilized to store the resource action rules 116.

From operation 204, the routine 200 proceeds to operation 206, where other types of interfaces might also be provided for defining and/or receiving resource action rules 116. For example, and without limitation, the rule processing component 114 or another component might define an API or another type of interface through which resource action rules 116 might be submitted. The resource action rules 116 might be defined utilizing the extensible markup language ("XML"), another type of declarative language, or in another manner altogether. In one specific implementation, a domain-specific language is utilized to define the resource action rules 116. Interfaces other than APIs might also be exposed for defining and/or receiving previously defined resource action rules 116.

From operation 206, the routine 200 proceeds to operation 208, where the resource action rules 116 defined and/or received at operation 206 may be stored in an appropriate data store. The routine 200 then proceeds from operation 208 to operation 210, where it ends.

FIG. 3 is a user interface ("UI") diagram showing one illustrative UI 300 disclosed herein for defining a resource action rule 116, according to one embodiment disclosed herein. The illustrative UI 300 shown in FIG. 3 includes a number of UI controls 302A-302G that may be utilized to define a resource action rule 116. In particular, the UI controls 302A-302C are utilized to define the particular type of resource to which the rule 116 applies and the conditions under which the rule 116 is satisfied. In the illustrative example, for instance, the UI control 302A is utilized to define the resource type (i.e. a host computer) to which the rule 116 applies. The UI controls 302B and 302C are utilized to define the conditions (i.e. the host computer has an executing instance AND the executing instance is owned by an external customer) under which the rule 116 is satisfied. It should be appreciated that the resource type and conditions shown in FIG. 3 are merely illustrative and that other resources and conditions might be specified. For example, and without limitation, the UI controls 302A-302C might present a list of choices when selected. Other types of UI controls might also be utilized.

The UI controls 302D-302G are utilized to define the action, or actions, that are taken when the conditions specified by the UI controls 302A-302C have been met. For example, the UI controls 302D and 302E are utilized in this example to specify that a UI object 122 should be displayed in the resource management UI 110 for a resource indicating "Do Not Touch" if the specified conditions have been met (i.e. a host computer is executing an instance owned by an external customer). In this way, the UI object 122 can be defined so that it includes data relating to the results 118 of the evaluation of a resource action rule 116. The UI 300 might allow the user to specify the particular content to be presented in the UI object 122 if the specified conditions are met.

The UI controls 302F and 302G are utilized in the example shown in FIG. 3 to specify that certain types of actions should also be prohibited in response to the specified conditions being met. In particular, in the illustrated example rebooting of the server computer is prohibited if the server is executing virtual machine instances 104A that are owned by external customers. The user might also be able to specify exceptions to the actions. For example, the user might be able to specify that only certain individuals or a group of individuals may reboot a server computer if the specified conditions are met. It should be appreciated that similar UI controls might be utilized to specify that other types of operations are prohibited and/or to specify actions that are to be taken in response to the identified conditions being met.

In the example UI 300 shown in FIG. 3, a UI control 302H is also provided through which a user can specify that results 118 of the evaluation of the defined rule 116 are to be propagated to other resources in the distributed execution environment 102. The results 118 of the evaluation of the rule 116 being defined in FIG. 3, for example, might be propagated to a related resource, such as a rack containing a server computer that satisfies the conditions specified in the rule 116.

Once a user has completed defining a new rule 116 using the UI 300 shown in FIG. 3, the user may select the UI control 302I using an appropriate user input mechanism, such as the mouse cursor 304 shown in FIG. 3, in order to save the rule 116. The user might alternately select the UI control 302J in order to cancel any input made to the UI 300. Any modifications made to the UI 300 will not be saved if the UI control 302J is selected.

It should be appreciated that more or fewer UI controls 300 than shown in FIG. 3 might be utilized in order to define other types of rules 116 having other types of conditions and actions in other implementations. For example, a user may be permitted to add or remove UI controls 302 in order to define a resource action rule 116 having desired conditions and actions. The user might also be permitted to specify various logical and arithmetic operators utilized in the rule 116. In this regard, it should be appreciated that the UI 300 shown in FIG. 3 is merely illustrative and that other types of UIs might be utilized to define the resource action rules 116.

Figure 4:
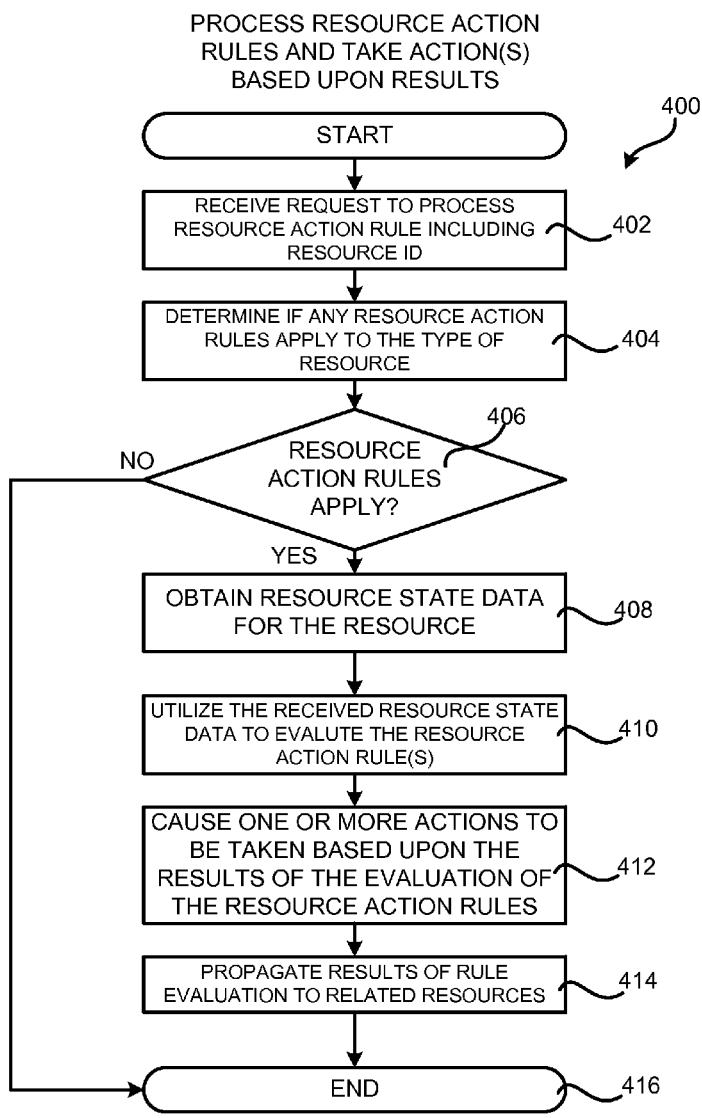
FIG. 4 is a flow diagram showing one illustrative routine for evaluating resource action rules and for taking action based upon the results of the evaluation of the resource action rules, according to embodiments disclosed herein.

FIG. 4 is a flow diagram showing one illustrative routine 400 for evaluating resource action rules 116 and for taking one or more actions based upon the results 118 of the evaluation of the resource action rules 116, according to one embodiment disclosed herein. The routine 400 begins at operation 402, where the rule processing component 114 receives a request to process resource action rules 116 for a resource. For example, and as described above, the resource state viewing tool 108 might provide such a request to the rule processing component 114 along with a resource ID 109 for the resource for which the resource action rules 116 are to be evaluated.

In response to receiving a request to evaluate resource action rules 116, the routine 400 proceeds from operation 402 to operation 404. At operation 404, the rule processing component 114 determines if any resource action rules 116 have been defined that apply to the specified resource. If no resource action rules 116 have been defined that apply to the specified resource, the routine 400 proceeds from operation 406 to operation 416, where it ends. If any resource action rules 116 apply to the specified resource, the routine 400 proceeds from operation 406 to operation 408.

At operation 408, the rule processing component 114 obtains the resource state data 107 for the specified resource. As mentioned above, for example, the rule processing component 114 might obtain the resource state data 107 from the resource monitoring component 106 or from another source. Once the rule processing component 114 has obtained the resource state data 107 for the specified resource, the routine 400 proceeds from operation 408 to operation 410.

At operation 410, the rule processing component 114 utilizes the obtained resource state data 107 to evaluate the conditions specified by the resource action rules 116 that apply to the specified resource. The routine 400 then proceeds from operation 410 to operation 412, where the rule processing component 114 causes the one or more actions defined by the rules 116 that apply to the specified resource to be performed. For example, and without limitation, a UI object 122 may be created and presented that includes information relating to the results 118 of the evaluation of the rule 116, other types of operations might be performed, operations might be prohibited, and other types of indications might be provided. The results 118 of the evaluation of the rules 116 might also be stored for use in responding to future requests to evaluate the rules 116 associated with a resource.

From operation 412, the routine 400 proceeds to operation 414 where the rule processing component 114 may propagate the results 118 of the evaluation performed at operation 410 to other resources in the distributed execution environment 102. As mentioned above, the rule processing component 114 may utilize the resource relationship graph 120 to identify the resources to which the results 118 are to be propagated. The rules 116 might also specify the manner in which results 118 are to be propagated. From operation 414, the routine 400 proceeds to operation 416, where it ends.

FIGS. 5 and 6 are UI diagrams showing several illustrative resource management UIs 110A and 110B, respectively, that include a UI object 122 containing content that is based upon the evaluation of a resource action rule 116 according to one embodiment disclosed herein. In the resource management UI 110A shown in FIG. 5, a graphical representation 502 of a server computer in the distributed execution environment 102 is displayed along with additional information about the selected server computer, such as information regarding the operational status of the selected server computer. For example, server information 504 might be displayed that indicates operational information about the corresponding server computer. This information might include, but is not limited to, the Internet protocol ("IP") address of the server computer, details regarding the software and hardware configuration of the server computer, the vendor or manufacturer of the server computer, information regarding the availability and/or utilization of the server computer, user-provided comments about the server computer, and other types of status information about the server computer. Other types of information might also be provided. Overlays might also be applied to the graphical representation 502 of the selected server computer to convey some of this information.

In the example resource management UI 110A shown in FIG. 5, graphical representations 506A-506C corresponding to virtual machine instances or other software components executing on the corresponding server are also presented. Various types of overlays might also be applied to the graphical representations 506A-506C to show information about these resources. A user might also be permitted to select one of the graphical representations 506A-506C in order to obtain more information about the instance or other software component.

The graphical representations 506A-506C might also be filtered in various ways in various embodiments. For example, and without limitation, the resource state viewing tool 108 or one or more other components might interface with an identity and access management system (not shown). A set of permissions might be obtained from the identity and access management system for a user requesting the resource management UI 110. The set of permissions for the user may be utilized to filter the graphical representations 506A-506C and UI objects 122, described in detail below, that are presented to the user in the resource management UI 110. Other mechanisms might also be utilized to filter the objects that are presented to a particular user based upon permissions associated with the user.

It should be appreciated that user permissions such as those described above might also be utilized in some embodiments when evaluating the resource action rules 116. For example, and without limitation, the resource action rule processing component 114 might utilize permissions associated with a user that created a resource action rule 116 to determine whether the user has sufficient permissions to perform the action, or actions, specified by the resource action rules 116. For example, and without limitation, certain users might not have sufficient rights to cause a UI object 122 to be presented in association with a resource, to prohibit actions from being taken with respect to the resource, and/or to cause other types of actions to be taken with regard to a resource. The resource action rule processing component 114 may utilize the permissions associated with a user in order to perform only those actions that the user has sufficient rights to perform.

It should also be appreciated that the resource action rules 116 might have a corresponding access control policy. For example, a rule indicating that a UI object 122 should be provided indicating "Do Not Touch" when certain conditions are met might have an associated access control policy also indicating that users with privileges lower than a certain level are not permitted to take certain actions with regard to the resource. If the specified conditions are met and a user attempts to take an action with respect to the resource, the results 118 associated with the corresponding resource action rule 118 and the associated access control policy may be provided to a policy evaluation engine (not shown). The policy evaluation engine may evaluate the request to modify the resource and determine whether the requested action can be authorized based upon the results 118 of the resource action rule 116 and the access control policy. It should be appreciated that this example is merely illustrative and that an access control policy might also be utilized and evaluated in conjunction with results 118 of the resource action rules 116 in other ways.

In some implementations, cross-account access to the results 118 of the resource action rules 116 might also be provided. For example, and without limitation, one customer of the distributed execution environment 102 might define a resource action rule 116 for which its results 118 might be shared with another customer of the distributed execution environment 102. In this way, for example, one customer might specify a resource action rule 116 that results in a UI object 122 being shown to another customer when the resource management UI 110 for a resource is presented. In another embodiment, a customer may define a resource action rule 116 for which its results 118 are shared with an administrator of the distributed execution environment 102. Such an implementation might be utilized to indicate important infrastructure information to an administrator or to share information with a customer support representative. Various types of policies might be defined in order to enable cross-account sharing in scenarios such as those described above.

The example resource management UI 110A shown in FIG. 5 also includes a UI object 122 generated as a result of the evaluation of one or more resource action rules 116 associated with the represented server computer. In this example, the UI object 122 is a graphical "badge" that contains text relating to the results 118 of the evaluation of the associated rules 116. It should be appreciated, however, that the UI object 122 might be pure text, might be presented as a different type of static graphic or animation, or might be presented in another fashion, such as an audible indicator. Additionally, the UI object 122 might include one or more other UI controls (not shown in FIG. 5) which, when selected, cause various actions to be taken with regard to the associated resource. Selection of the UI object 122 (e.g. double clicking with a mouse) might present additional information regarding the results 118 of the evaluation of the rule 116, or rules 116.

The UI object 122 might also be configured to provide additional information regarding the results 118 of the evaluation of the relevant resource action rules 116 in some embodiments. For instance, in the example shown in FIG. 6, the UI control 122 is configured to display additional text 510 in response to a user hovering a mouse cursor 304 over the UI object 122. In this regard, it should be appreciated that the text 510 might be displayed continually or in response to other types of input. Additionally, the UI control 122 might be configured to present other types of information in other implementations.

As discussed above, the results 118 of the evaluation of resource action rules 116 for a resource may be propagated to other resources. The propagated results 118 may then be utilized to take various actions with regard to the resource to which the results 118 were propagated. For example, and without limitation, the results 118 of the evaluation of one or more resource action rules 116 might be propagated to other resources for use in presenting a UI control 122 that indicates the status of a related resource. For instance, the example resource management UI 110B shown in FIG. 6 includes graphical representations 602A-602L of server computers in a rack.

In the example shown in FIG. 6, the graphical representation 602K corresponds to the server computer represented in the example resource management UI 110A shown in FIG. 5. Additionally, the results 118 of the evaluation of the resource action rules 116 associated with the server computer represented in FIG. 5 have been propagated to the rack containing the represented server computer. Consequently, the resource management UI 110B shown in FIG. 6 also includes a UI object 122 that includes information relating to the evaluation of the resource action rules 116. In particular, the UI object 122 shown in FIG. 6 indicates that at least one server in the represented rack (i.e. the server represented by the graphical representation 602K) has external customer instances executing thereon and, therefore, the rack should not be modified in a manner that might impact the customer instances (e.g. powered down).

The UI object 122 shown in FIG. 6 might also have additional text 510 presented therewith that provides additional information regarding the content presented in the UI object 122. As mentioned above, the text 510 might be displayed in response to a user hovering a mouse cursor 304 over the UI object 122. Other types of user input might also cause the text 510 to be presented. The UI object 122 might also have other UI controls displayed therewith for taking various types of actions with regard to the represented resource (i.e. the rack of server computers represented in FIG. 6). The available actions for a particular resource may be defined by the resource action rules 116. In this regard, it should be appreciated that the presentation of the UI object 122 depicted in FIGS. 5 and 6 is merely illustrative, that other configurations might be utilized, and that other types of functionality might be provided by the UI object 122 in other implementations.

It should be appreciated that, in some implementations, the results 118 of the evaluation of the resource action rules 116 might be stored and utilized for other purposes. For example, and without limitation, the results 118 might be utilized to generate metrics regarding resources in the distributed execution environment 102 (e.g. metrics defining a number of resources satisfying a certain rule or rules 116), might be utilized to cluster resources in the distributed execution environment 102 (e.g. cluster resources together that satisfy a certain rule or rules 116), and/or the results 118 might be utilized to search for resources in the distributed execution environment 102 (e.g. resources that satisfy a certain rule or rules 116). The results 118 might also be utilized for other purposes not specifically mentioned herein.

It should also be appreciated that while the embodiments disclosed herein have been primarily presented using examples applicable to an administrator of the distributed execution environment 102, the embodiments disclosed herein might also be utilized by customers of the distributed execution environment 102. For example, and without limitation, a customer of the distributed execution environment 102 might utilize a user computing system, like a desktop or laptop computer, a smartphone, or a tablet computing device to request and view the resource management UI 110 for a particular resource. In this example, the customer might also configure resource action rules 116 to present custom UI objects 122 when resources in the distributed execution environment 102 owned by the customer are viewed in the resource management UI 110. For example, and without limitation, a customer might define a resource action rule 116 that presents an informational message in a UI object 122 when a virtual machine instance executing a database utilized by the customer is displayed in the resource management UI 110. Customers of the distributed execution environment 102 might also define other types of resource action rules 116 for use in conjunction with resources owned by the customers.

Figure 7:
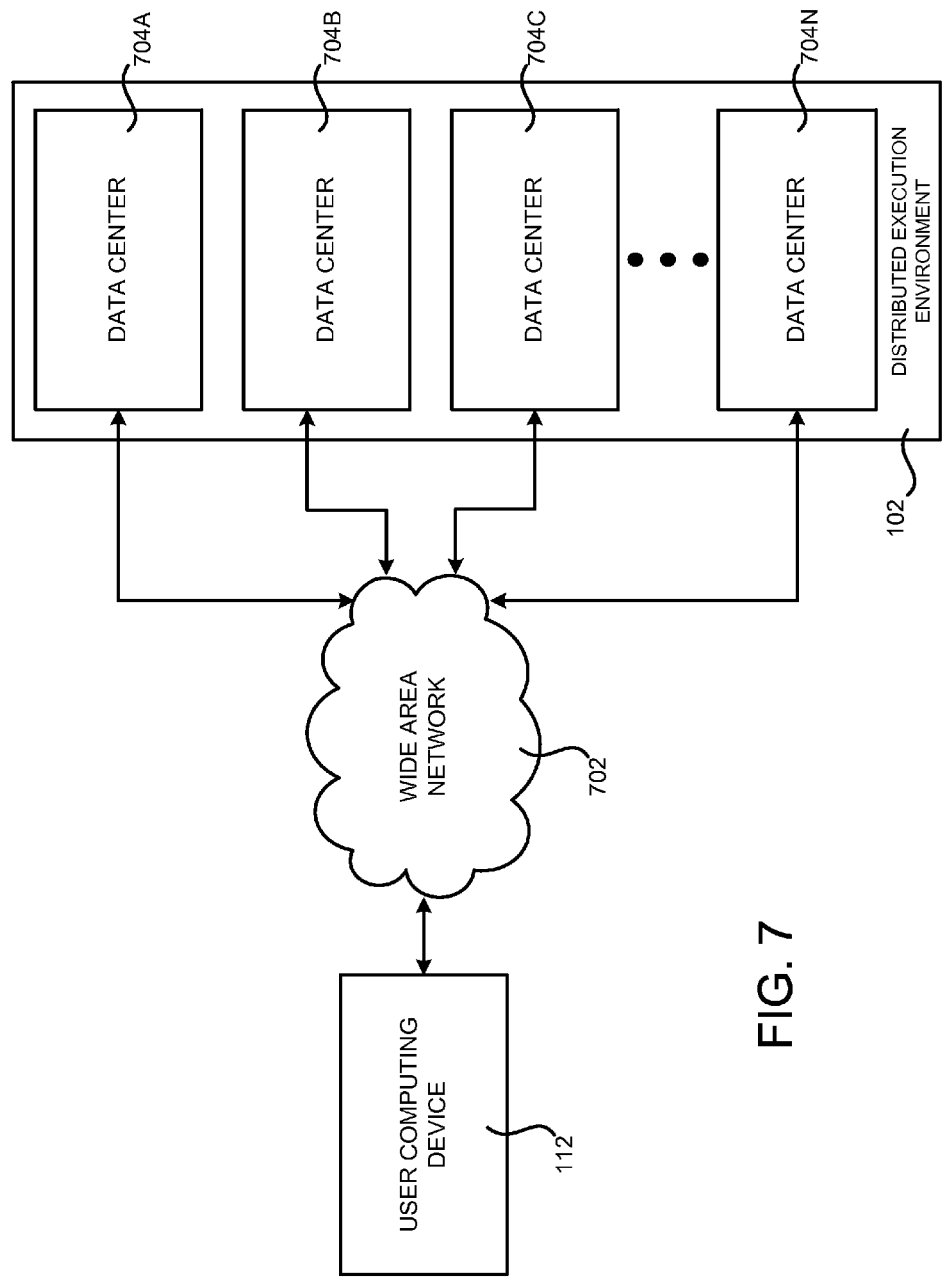
FIG. 7 is a system and network diagram that shows one illustrative operating environment for the embodiments disclosed herein that includes a distributed execution environment.

FIG. 7 and the following description are intended to provide a brief, general description of a suitable computing environment in which the embodiments described herein may be implemented. In particular, FIG. 7 is a system and network diagram that shows an illustrative operating environment that includes a distributed execution environment 102. As discussed above, the distributed execution environment 102 can provide instances of computing resources on a permanent or an as-needed basis.

The instances of computing resources provided by the distributed execution environment 102 may include various types of resources, such as data processing resources, data storage resources, networking resources, data communication resources, and the like. Each type of computing resource may be general-purpose or may be available in a number of specific configurations. For example, and as discussed briefly above, instances of data processing resources may be available as virtual machine instances in a number of different configurations. The virtual machine instances may be configured to execute applications, including Web servers, application servers, media servers, database servers, and other types of applications. Instances of data storage resources may include file storage devices, block storage devices, and the like. Each type or configuration of an instance of a computing resource may be available in different sizes, such as large resources, consisting of many processors, large amounts of memory, and/or large storage capacity, and small resources consisting of fewer processors, smaller amounts of memory, and/or smaller storage capacity.

As also mentioned above, the instances of computing resources provided by the distributed execution environment 102 are enabled in one implementation by one or more data centers 704A-704N (which may be referred to herein singularly as "a data center 704" or collectively as "the data centers 704"). The data centers 704 are facilities utilized to house and operate computer systems and associated components. The data centers 704 typically include redundant and backup power, communications, cooling, and security systems. The data centers 704 might also be located in geographically disparate locations. One illustrative configuration for a data center 704 that may be utilized to implement the concepts and technologies disclosed herein for performing rule-based actions for resources in a distributed execution environment 102 will be described below with regard to FIG. 8.

Users of the distributed execution environment 102 may access the computing resources provided by the data centers 704 over a suitable data communications network, such as a Wide Area Network ("WAN") 702. Although a WAN 702 is illustrated in FIG. 7, it should be appreciated that a local-area network ("LAN"), the Internet, or any other networking topology known in the art that connects the data centers 704 to the user computing devices 112 may be utilized. It should also be appreciated that combinations of such networks might also be utilized.

Figure 8:
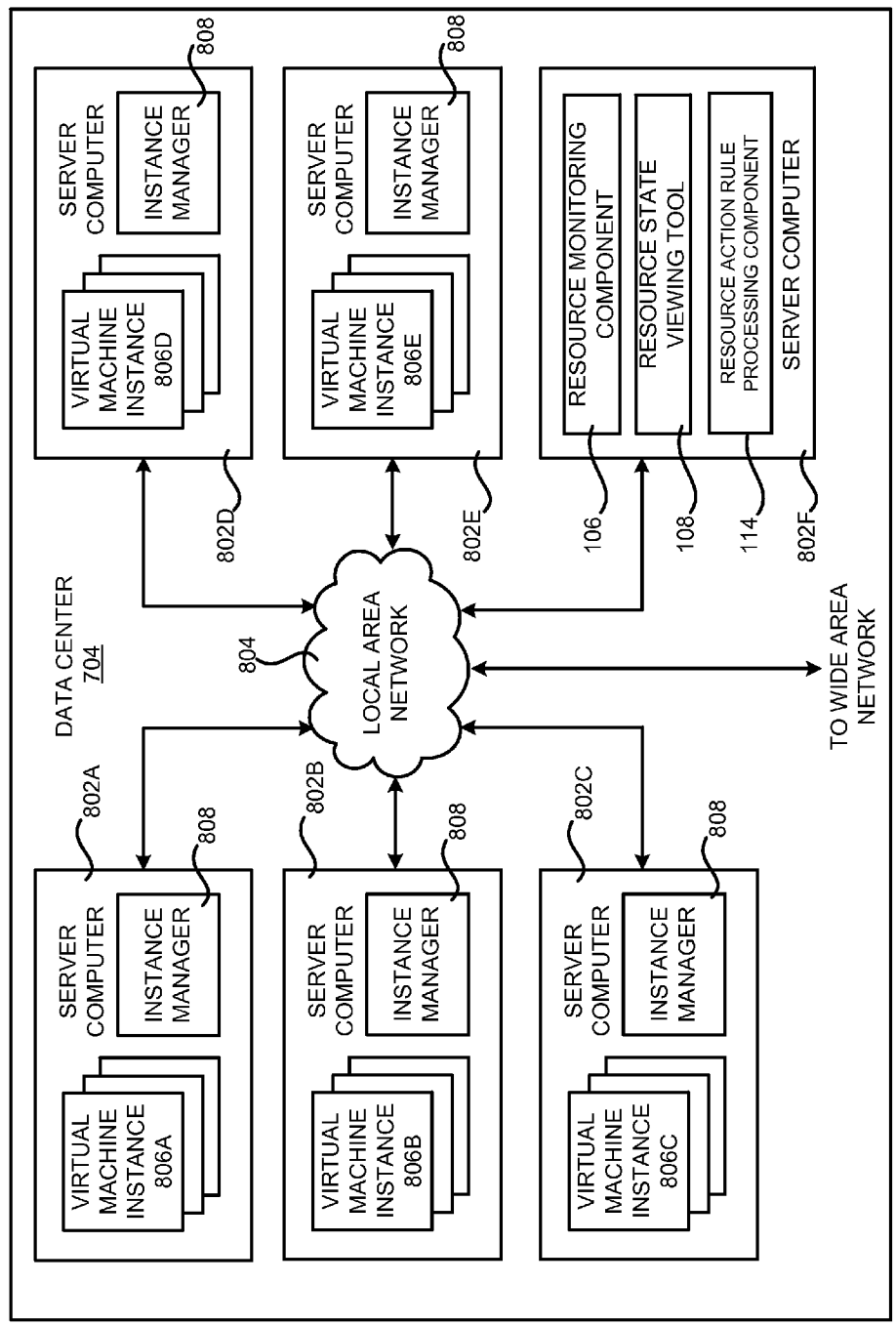
FIG. 8 is a computing system diagram that illustrates one configuration for a data center that implements aspects of the concepts and technologies disclosed herein for performing actions based upon the results of evaluating rules associated with resources in a distributed execution environment, according to one embodiment disclosed herein.

FIG. 8 is a computing system diagram that illustrates one configuration for a data center 704 that implements a distributed execution environment 102, including the concepts and technologies disclosed herein for performing rule-based actions for resources. The example data center 704 shown in FIG. 8 includes several server computers 802A-802F (which may be referred to herein singularly as "a server computer 802" or in the plural as "the server computers 802"). As mentioned briefly above, the server computers 802 may be standard tower or rack-mount server computers configured appropriately for providing the computing resources described herein. For example, in one implementation the server computers 802 are configured to provide the virtual machine instances 806A-806E.

As known in the art, a virtual machine instance is an instance of a software implementation of a machine (i.e. a computer) that executes programs like a physical machine. Each of the servers 802 may be configured to execute an instance manager 808 capable of instantiating and managing the virtual machine instances 806. The instance manager 808 might be a hypervisor or another type of program configured to enable the execution of multiple virtual machine instances 806 on a single server 802, for example.

It should be appreciated that although the embodiments disclosed herein are described primarily in the context of virtual machine instances 806, other types of instances of computing resources can be utilized with the concepts and technologies disclosed herein. For instance, the technologies disclosed herein might be utilized with instances of hardware resources, instances of data storage resources, instances of data communications resources, instances of networking resources, instances of database resources, and with other types of instances of computing resources.

The data center 704 shown in FIG. 8 also includes a server computer 802F reserved for executing software components for managing the operation of the data center 704, the server computers 802, the instances 104, and other resources within the distributed execution environment 102. In particular, the server computer 802F might execute the resource monitoring component 106, the resource state viewing tool 108, and the resource action rule processing component 114. Details regarding the operation of each of these components have been provided above. In this regard, it should be appreciated that while these components are illustrated as executing within the distributed execution environment 102, computing systems that are external to the distributed execution environment 102 might also be utilized to execute some or all of these components. Other configurations might also be utilized.

In the example data center 704 shown in FIG. 8, an appropriate local area network ("LAN") 804 is utilized to interconnect the server computers 802A-802E and the server computer 802F. The LAN 804 is also connected to the WAN 702 illustrated in FIG. 7. It should be appreciated that the configuration and network topology illustrated in FIGS. 7 and 8 has been greatly simplified and that many more computing systems, networks, and networking devices may be utilized to interconnect the various computing systems disclosed herein. Appropriate load balancing devices or software modules might also be utilized for balancing a load between each of the data centers 704A-704N, between each of the server computers 802A-802F in each data center 704, and between virtual machine instances 806 provided by the server computers 802A-802F.

It should be appreciated that the data center 704 described in FIG. 8 is merely illustrative and that other implementations might be utilized. In particular, functionality described herein as being performed by the resource monitoring component 106, the resource state viewing tool 108, and the resource action rule processing component 114 might be performed by one another, might be performed by other components, or might be performed by a combination of these or other components. Additionally, it should be appreciated that the functionality provided by these components might be implemented in software, hardware, or a combination of software and hardware. Other implementations should be apparent to those skilled in the art.

Figure 9:
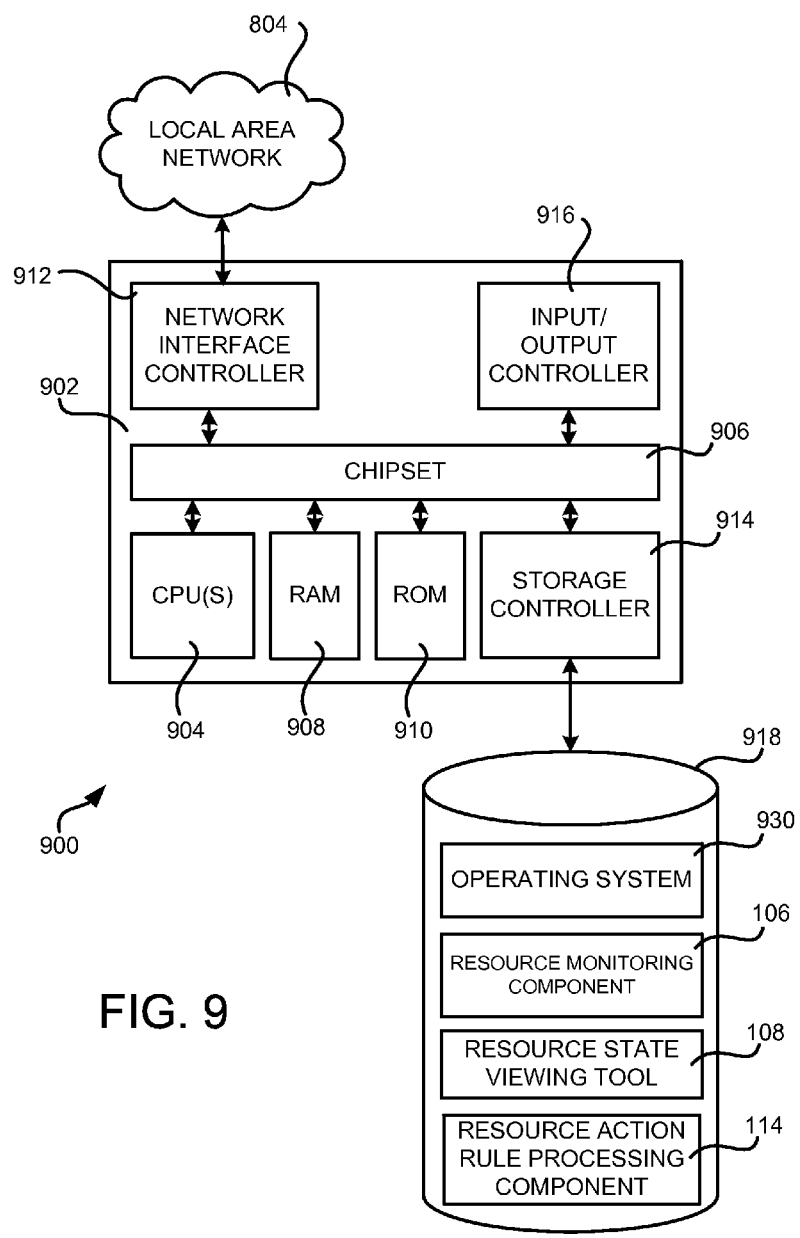
FIG. 9 is a computer architecture diagram showing one illustrative computer hardware architecture for implementing a computing device that might be utilized to implement aspects of the various embodiments presented herein.

FIG. 9 shows an example computer architecture for a computer 900 capable of executing the program components described above for performing actions based upon the evaluation of resource action rules 116 for resources in a distributed execution environment 102. The computer architecture shown in FIG. 9 illustrates a conventional server computer, workstation, desktop computer, laptop, tablet, network appliance, personal digital assistant ("PDA"), e-reader, digital cellular phone, or other computing device, and may be utilized to execute any aspects of the software components presented herein described as executing on the user computing devices 112A-112C, within the data centers 704A-704N, on the server computers 802A-802F, or on any other computing system mentioned herein.

The computer 900 includes a baseboard 902, or "motherboard," which is a printed circuit board to which a multitude of components or devices may be connected by way of a system bus or other electrical communication paths. In one illustrative embodiment, one or more central processing units ("CPUs") 904 operate in conjunction with a chipset 906. The CPUs 904 may be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 may provide an interface to a random access memory ("RAM") 908, used as the main memory in the computer 900. The chipset 906 may further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM may also store other software components necessary for the operation of the computer 900 in accordance with the embodiments described herein.

The computer 900 may operate in a networked environment using logical connections to remote computing devices and computer systems through a network, such as the local area network 804. The chipset 906 may include functionality for providing network connectivity through a NIC 912, such as a gigabit Ethernet adapter. The NIC 912 is capable of connecting the computer 900 to other computing devices over the network 804. It should be appreciated that multiple NICs 912 may be present in the computer 900, connecting the computer to other types of networks and remote computer systems.

The computer 900 may be connected to a mass storage device 918 that provides non-volatile storage for the computer. The mass storage device 918 may store system programs, application programs, other program modules, and data, which have been described in greater detail herein. The mass storage device 918 may be connected to the computer 900 through a storage controller 914 connected to the chipset 906. The mass storage device 918 may consist of one or more physical storage units. The storage controller 914 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 may store data on the mass storage device 918 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 918 is characterized as primary or secondary storage, and the like.

For example, the computer 900 may store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 may further read information from the mass storage device 918 by detecting the physical states or characteristics of one or more particular locations within the physical storage units.

In addition to the mass storage device 918 described above, the computer 900 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 900.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 918 may store an operating system 930 utilized to control the operation of the computer 900. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 918 may store other system or application programs and data utilized by the computer 900, such as the resource monitoring component 106, the resource state viewing tool 108, the resource action rule processing component 114, and/or any of the other software components and data described above. The mass storage device 918 might also store other programs and data not specifically identified herein.

In one embodiment, the mass storage device 918 or other computer-readable storage media is encoded with computer-executable instructions which, when loaded into the computer 900, transforms the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the various routines described above with regard to FIGS. 2 and 4.

The computer 900 may also include one or more input/output controllers 916 for receiving and processing input from a number of input devices, such as a keyboard, a mouse, a touchpad, a touch screen, an electronic stylus, or other type of input device. The input/output controllers 916 might also receive input from a digital camera and/or video camera, a GPS sensor, a compass, a gyroscope, or another type of sensor utilized to determine the location and/or the orientation of the computer 900. The input/output controller 916 might also be connected to one or more wireless radios for facilitating wireless communication with the computer 900.

The input/output controller 916 might also provide output to a display, such as a computer monitor, a flat-panel display, a digital projector, a printer, a plotter, or other type of output device. It will be appreciated that the computer 900 may not include all of the components shown in FIG. 9, may include other components that are not explicitly shown in FIG. 9, or may utilize an architecture completely different than that shown in FIG. 9. For example, the computer 900 might be implemented utilizing system on a chip ("SOC") technologies and other types of technologies suitable for use in implementing smartphones, tablet computing devices, and other types of mobile computing devices.

Based on the foregoing, it should be appreciated that technologies for performing actions based upon the results of evaluating rules associated with resources in a distributed execution environment have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for performing an action utilizing a resource action rule associated with a resource in a distributed execution environment, the method comprising performing computer-implemented operations for:
   receiving a request from a user computing device operated by a user to view a user interface (UI) providing:
      data regarding an operational state of the resource in the distributed execution environment, and
      a graphical representation of the resource; and
   in response to receiving the request:
      obtaining a set of permissions for the user, the set of permissions providing access to the graphical representation of the resource;
      identifying a resource action rule associated with the resource, the resource action rule providing permission for the user to access a UI object generated based on the resource action rule;
      obtaining resource state data for the resource,
      evaluating the resource action rule associated with the resource using the resource state data, and
      generating, based on the obtained set of permissions and the evaluation of the resource action rule using the resource state data, the graphical representation of the resource and the UI object for presentation in the UI, the UI object containing content based, at least in part, upon results of the evaluation of the resource action rule associated with the resource.

2. The computer-implemented method of claim 1, further comprising prohibiting at least one operation from being taken with regard to the resource based upon the results of the evaluation of the resource action rule associated with the resource.

3. The computer-implemented method of claim 1, further comprising causing at least one operation to be performed with regard to the resource based upon the results of the evaluation of the resource action rule associated with the resource.

4. The computer-implemented method of claim 3, wherein the at least one operation comprises causing a hardware device associated with the resource to provide an indication of the results of the evaluation of the resource action rule associated with the resource.

5. The computer-implemented method of claim 1, further comprising propagating the results of the evaluation of the resource action rule associated with the resource to one or more other resources in the distributed execution environment.

6. The computer-implemented method of claim 1, further comprising providing a UI for defining the resource action rule.

7. The computer-implemented method of claim 1, wherein the UI object is configured to present information relating to the results of the evaluation of the resource action rule and one or more UI controls which, when selected, will cause an action to be taken with respect to the resource.

8. An apparatus for performing actions based upon rules associated with resources in a distributed execution environment, the apparatus comprising:
   a processor; and
   a non-transitory computer-readable storage medium having computer-executable instructions stored thereupon which, when executed by the processor, cause the processor to:
      receive a request from a user computing device operated by a user to view data regarding a resource in a distributed execution environment,
      obtain a set of permissions for the user, the set of permissions providing access to the data regarding the resource,
      identify one or more rules associated with the resource, the one or more rules providing permission for the user to access a user interface (UI) object corresponding to the resource,
      evaluate the one or more rules utilizing resource state data associated with the resource, and
      cause, based on the obtained set of permissions and the evaluation of the one or more rules, the user interface (UI) object such that the UI object comprises data based, at least in part, on results of the evaluation of the one or more rules associated with the resource in the distributed execution environment.

9. The apparatus of claim 8, wherein the UI object comprises one or more UI controls which, when selected, will cause an action to be taken with regard to the resource in the distributed execution environment.

10. The apparatus of claim 8, wherein the non-transitory computer-readable storage medium has further computer-executable instructions stored thereupon which, when executed by the processor, cause the apparatus to prevent one or more operations from being taken with regard to the resource based upon results of the evaluation of the one or more rules associated with the resource in the distributed execution environment.

11. The apparatus of claim 8, wherein the non-transitory computer-readable storage medium has further computer-executable instructions stored thereupon which, when executed by the processor, cause the apparatus to cause a workflow to be initiated with regard to the resource based, at least in part, upon results of the evaluation of the one or more rules associated with the resource.

12. The apparatus of claim 8, wherein the non-transitory computer-readable storage medium has further computer-executable instructions stored thereupon which, when executed by the processor, cause the apparatus to provide a signal to a hardware device associated with the resource to provide an indication of the results of the evaluation of the one or more rules associated with the resource.

13. The apparatus of claim 8, wherein the non-transitory computer-readable storage medium has further computer-executable instructions stored thereupon which, when executed by the processor, cause the apparatus to provide a graphical user interface for defining the one or more rules.

14. The apparatus of claim 8, wherein the non-transitory computer-readable storage medium has further computer-executable instructions stored thereupon which, when executed by the processor, cause the apparatus to propagate the results of the evaluation of the one or more rules associated with the resource to one or more other resources in the distributed execution environment.

15. A non-transitory computer-readable storage medium having computer-executable instructions stored thereupon which, when executed by a computer, cause the computer to:
   receive a request from a user computing device operated by a user to view data regarding a resource in a distributed execution environment;
   obtain a set of permissions for the user, the set of permissions providing access to the data regarding the resource;
   identify one or more resource action rules associated with a resource in a distributed execution environment, the one or more resource action rules providing permission for the user to access content corresponding to resource state data associated with the resource;
   obtain resource state data associated with the resource;
   evaluate the one or more resource action rules utilizing the obtained resource state data associated with the resource; and
   cause, based on the obtained set of permissions and the evaluation of the one or more resource action rules, an informational notice to be presented in a user interface (UI) that contains content based, at least in part, upon the evaluation of the one or more resource action rules utilizing the obtained resource state data associated with the resource.

16. The non-transitory computer-readable storage medium of claim 15, having further computer-executable instructions stored thereupon which, when executed by the computer, cause the computer to cause one or more additional actions to be taken based, at least in part, upon the results of the evaluation of the one or more resource action rules associated with the resource.

17. The non-transitory computer-readable storage medium of claim 16, wherein at least one of the one or more additional actions comprises prohibiting at least one operation from being taken with regard to the resource based, at least in part, upon the results of the evaluation of the one or more resource action rules associated with the resource.

18. The non-transitory computer-readable storage medium of claim 16, wherein at least one of the one or more additional actions comprises causing a workflow to be initiated with regard to the resource based, at least in part, upon the results of the evaluation of the one or more resource action rules associated with the resource.

19. The non-transitory computer-readable storage medium of claim 15, wherein the non-transitory computer-readable storage medium has further computer-executable instructions stored thereupon which, when executed by the computer, cause the computer to:

propagate the results of the evaluation of the one or more resource action rules associated with the resource to one or more other resources in the distributed execution environment.

20. The non-transitory computer-readable storage medium of claim 15, wherein the non-transitory computer-readable storage medium has further computer-executable instructions stored thereupon which, when executed by the computer, cause the computer to provide a graphical user interface for defining the one or more resource action rules.

* * * * *